United States Patent [19]

Ehrhart et al.

[11] Patent Number: 4,496,674
[45] Date of Patent: Jan. 29, 1985

[54] GASKET MATERIALS COMPRISING POLYESTER AND RICE HULLS

[75] Inventors: Wendell A. Ehrhart, Hellam; Ronald S. Lenox, East Hempfield Township, Westmoreland Co.; Moses Sparks, Jr., Manheim Township, Lancaster County, all of Pa.

[73] Assignee: Armstrong World Industries, Inc., Lancaster, Pa.

[21] Appl. No.: 552,622

[22] Filed: Nov. 17, 1983

[51] Int. Cl.$^3$ .......................... C08K 5/00; C08K 11/00
[52] U.S. Cl. .................................... 523/500; 523/509; 523/511; 524/15
[58] Field of Search .................. 524/15; 523/509, 500, 523/511

[56] References Cited

U.S. PATENT DOCUMENTS

| | | | |
|---|---|---|---|
| 3,554,941 | 1/1971 | Varnell | 523/515 |
| 3,932,319 | 1/1976 | Clendinning et al. | 524/26 |
| 3,951,907 | 4/1976 | Mehta | 524/430 |
| 4,141,863 | 2/1979 | Coran et al. | 260/3 |
| 4,202,803 | 5/1980 | Signoretto | 428/496 |
| 4,287,324 | 9/1981 | Coran et al. | 525/408 |
| 4,290,927 | 9/1981 | Tanaka et al. | 525/177 |
| 4,327,199 | 4/1982 | Coran et al. | 525/919 |
| 4,379,190 | 4/1983 | Schenck | 524/14 |
| 4,403,007 | 9/1983 | Couglin | 524/15 |

OTHER PUBLICATIONS

"Rice Hulls" Hsu et al., pp. 736–763.
J. Sci. Ind. Res. 9–1980, pp. 495–515 Govindarao.
Plastics Compounding Redbook 1982/3, vol. 5, pp. 62, 63, 81–84, 87.
Plastics Compounding, pp. 47–50 Mar./Apr. 1981 Willis et al.
Society Automobile Engineering Kessler 1977 Symposium.

*Primary Examiner*—Herbert J. Lilling
*Attorney, Agent, or Firm*—Laird F. Miller

[57] ABSTRACT

The present invention relates to gasketing materials comprising a rubber binder, a pulverized rice hull filler and a polyester which preferably is crystallizable. The rice hull material acts as a reinforcing filler and, in combination with the rubber and polyester, provides gasketing materials which demonstrate the ability to conform to flange irregularities. As a result, the gaskets demonstrate remarkable sealing capabilities. When they comprise nitrile rubbers, they are also resistant to fuel absorption.

63 Claims, No Drawings

GASKET MATERIALS COMPRISING POLYESTER AND RICE HULLS

The present invention relates to gasketing materials and, more particularly, to gasketing materials which demonstrate improved performance characteristics.

BACKGROUND OF THE INVENTION

Gasketing materials are well known in the art and they play an important role in all facets of everyday life. A gasket is a device or medium used to create and maintain a barrier against the transfer of fluids across separable surfaces of a mechanical assembly that do not move relative to each other. Many types of gasket materials are presently in use. For example, asbestos-rubber, cellulose-rubber, cork composition, cork-rubber and rubber gaskets are all found in various phases of industry.

One of the most common types of gasketing is cork-rubber gasketing. Cork is a highly compressible material which lends itself to a wide variety of gasketing applications; nevertheless, it suffers from certain defects. For example, cork is porous and tends to swell when exposed to fuel and other petroleum-based products. Another problem related to the use of cork is that it is a natural material which is in finite supply. In recent years, the cost of cork has increased dramatically and this cost increase has led to widespread industry attempts to find replacement materials which are effective, yet which are lower in cost.

A filler material which has received increasing attention because of its low cost and availability is rice hulls, a by-product of rice refining. The individual rice hulls are light-weight fiberous materials which primarily contain cellulose, but which also comprise about 25% inorganic materials, much of which is silica.

Rice hulls have been used in animal feeds, in agriculture, as fuels, and as raw materials for the production of carbon particles, organic and inorganic chemicals, abrasives and refractory materials. In addition, they have been used as fillers for cements, building boards and the like. Nevertheless, they have not been used as cork substitutes in gasketing materials.

Despite widespread attempts to utilize rice hulls, the results have not been entirely satisfactory. The art contains reports that rice hulls require pretreatment with coupling and/or wetting agents in order to make them suitable for use as fillers. Alternative treatments have included the partial or complete incineration of the hulls to provide ash which has been used as a filler. Nevertheless, it has been found that such modifications increase the cost of the filler and often do not significantly improve its characteristics.

Accordingly, one objective of the present invention is to provide rice hull compositions wherein the rice hulls serve as replacements for conventional fillers.

Another objective of the present invention is to provide low-cost gasketing materials which exhibit superior performance characteristics.

Yet another objective of the present invention is to provide gasketing materials which are adaptable to conform to flange contours, thereby providing superior seals.

Still yet another objective of the present invention is to provide improved gasketing materials which will be resistant to fuel absorption.

These and other objectives of the present invention will become apparent from the detailed description of preferred embodiments which follow.

SUMMARY OF THE INVENTION

The present invention relates to gasketing materials comprising a rubber binder, a pulverized rice hull filler and a polyester which preferably is crystallizable. The rice hull material acts as a reinforcing filler and, in combination with the rubber and polyester, provides gasketing materials which demonstrate the ability to conform to flange irregularities. As a result, the gaskets demonstrate remarkable sealing capabilities. When they comprise nitrile rubbers, they are also resistant to fuel absorption.

DETAILED DESCRIPTION OF PREFERRED EMBODIMENTS

In one embodiment, the present invention relates to a cured gasket composition obtained from a mixture comprising by weight 100 parts of a rubber binder; from about 5 to about 100 parts of pulverized rice hulls; and from about 1 to about 200 parts of a polyester having a weight average molecular weight of from about 1,000 to about 500,000.

In a second embodiment, the present invention relates to a cured gasket composition obtained from a mixture comprising by weight 100 parts of a rubber binder; from about 5 to about 1,000 parts of pulverized rice hulls; and from about 1 to about 200 parts of a crystallizable polyester having a weight average molecular weight of from about 1,000 to about 500,000 and having a Tg of from about $-50$ to about $+80°$ C., said binder and said polyester comprising a polymer blend which exhibits Tg's attributable to the polyester and to the binder, said polyester comprising domains in which said polyester is at least partially crystalline under ambient conditions, but which can assume a substantially noncrystalline state in the operating environment of the gasket.

In a third embodiment, the present invention relates to a process for forming a gasket material, said process comprising the steps of preparing a composition comprising by weight (a) 100 parts of a rubber binder; (b) from about 5 to about 1,000 parts of pulverized rice hulls; and (c) from about 1 to about 200 parts of a polyester having a weight average molecular weight of from about 1,000 to about 500,000; forming said composition into a desired configuration; and curing said formed composition.

A curable rubber binder, pulverized rice hull filler and a polyester which preferably is crystallizable will be required to practice the present invention. Rubber binders are well known in the art and they have previously been used widely in preparing gasketing materials. Many types of rubber binders may be used to practice the present invention. Illustrative examples of such binders are nitrile rubbers, SBR rubbers, cis-polybutadiene rubbers, butyl rubbers, cis-polyisoprene rubbers, EPDM rubbers, neoprene rubbers, silicone rubbers, fluorocarbon rubbers, and the like. Nitrile rubbers are presently in use in automotive gaskets because of their resistance to oil, and they have been found to give superior results when used in practicing the present invention. As an added consideration, the practice of the present invention is not restricted to the use of a single rubber binder. Thus, combinations of rubber binders may be used to give gaskets with specially modified properties.

The second required ingredient for practicing the present invention is a pulverized rice hull filler material. Rice hulls are typically sold in a pulverized form and essentially all of the filler material used in practicing the present invention should be capable of passing through a 30-mesh sieve (U.S. Standard). Preferably, however, not more than about 5% of the rice hulls will be larger than 80 mesh. No pretreatment with wetting or coupling agents is required. Although such pretreatment may be used at the artisans discretion, for purposes of practicing the present invention, there appears to be little advantage in doing so. As will be indicated below, however, pretreatment with oil may be advantageous.

In addition to the rice hulls and rubber binder, the compositions will also comprise one or more polyesters which are derived by procedures well known in the art from monomeric diols and monomeric diacids or acid derivatives. Typical acid derivatives would include esters of low boiling alcohols and acid anhydrides. Preferably, the acid portion of the polyester will be aromatic or saturated aliphatic, although unsaturated acids such as fumaric or maleic acid can also be used. Simple diols are preferred when practicing the invention; however, polyether glycols may also be substituted for, or used in combination with, simple diols. As an added consideration, the polyester may be capped with acrylate and/or methacrylate groups by means well known in the art.

The aforementioned polyesters will have a weight average minimum molecular weight of about 1,000 and a weight average maximum molecular weight of about 500,000 as determined by gel permeation chromatography using polystyrene calibration. Preferably, however, the molecular weight will range from about 2,000 to about 300,000, and most preferably from about 2,000 to about 50,000.

The most preferred composition for variable temperature engine applications will comprise polyesters having the foregoing characteristics wherein the polyesters are at least partially crystalline under ambient conditions. Thus, the polyester should have a Tg of from about −50° to about +80° C. Preferably, however, the Tg should be from about −20° to about +35° C.

In order to be processable on conventional steam-heated mixing equipment, the polyester should be capable of assuming a fluid condition during the mixing process where the temperature approaches about 300° F. Preferably it should be capable of being fluid at about 270°–280° F., which is the usually desired temperature range encountered during processing. The fluid state of the polyester is important because, in this state, the polyester often facilitates the blending of the rice hulls with the rubber binder. In the absence of polyester, prolonged mixing is required to mix the rice hulls with the rubber binder. In certain instances, such as with EPDM binder, oil extension may be required even in the presence of the polyester. Illustrative examples of commercially available polyesters which are suitable to practice the present invention are Vitel VPE 4709, VPE 5571 and VPE 10035 polyesters from Goodyear Chemical Co.

Although rice hulls are not as compressible as cork, in the combination of the present invention they have been shown to provide durable gasketing materials which are characterized by a smooth, yet leathery, feel. The gaskets have excellent sealing properties and, in addition, they have shown a very good ability to recover or rebound to essentially their original thickness when the compressing force was removed. The good sealing capability appears to be obtainable because the laminar component of ground rice hulls can be aligned during the laying up process to provide sheets of material which have a smooth surface. Although alignment is not required, the smooth surface of an aligned product in combination with the reinforcing effect of the rice hull material tends to give products with high gas sealing ability. The reinforcing phenomenon may be attributable to the fibrous nature some of the ground rice hull particles, the presence of silica in the rice hulls, and/or the geometric shape of the ground rice hull particles. The latter characteristic may be of significance because rice hulls are distinguishable in performance from other natural products. Thus, when other natural products such as peanut shell flour, ground corn cobs or wood flour which have little or no inherent particle geometry are substituted for rice hulls, lower quality gaskets are obtained.

One method of practicing the present invention is to place the rubber (which preferably is nitrile rubber), the rice hulls and the polyester in a mixer such as a Banbury mixer. Typically, the mixture will comprise from about 1 to about 200 parts by weight of polyester and from about 5 to about 1,000 parts by weight of rice hulls for every 100 parts by weight of rubber binder. Preferably, however, the mixture will comprise from about 10 to about 150 parts of polyester and from about 50 to about 800 parts of rice hulls for every 100 parts of rubber binder.

The components are mixed until the temperature of the mixture reaches about 230° to 275° F. and the temperature is then maintained until a desired mixing consistency is obtained. Prolonged heating at higher temperatures is not desired because the rubber binder may tend to scorch.

If the gasketing material is to be cured by conventional techniques, a peroxide or a sulfur/accelerator system can then be added and mixed. The latter type of curing system is well known in the art and can comprise activators such as zinc oxide and stearic acid; a primary accelerator such as a thiazole accelerator; a secondary accelerator such as a thiuram accelerator; and a vulcanizing agent such as sulfur.

If non-conventional curing such as electron beam curing is used, no initiator is required; however, promoters may be added at an artisan's discretion. Examples of primary promoters are p-phenylene dimaleimide, N-phenylmaleimide and acrylate monomers; however, secondary promoters such as chlorinated aromatics and soaps could also be used.

Other materials may also be added at the artisan's discretion, provided that they do not adversely affect the quality of the product. For example, carbon black, tackifiers, processing oils, plasticizers, anti-oxidants, stabilizers, antiscorch agents and certain filler materials may be added under appropriate circumstances without adverse results.

After mixing is complete, the batch is dropped from the mixer and is calendered to sheet off the material. The sheet product is then cured by electron beam, or by heating a sheet which comprises a conventional sulfur-/accelerator curing package. The cutting of the material into appropriate gaskets may be achieved either before or after the sheet is cured.

When using the conventional curing method, it has been found that temperatures of from about 325° to about 335° F. are needed for at least 10–15 minutes in order to adequately cure the product. Lower temperatures do not lead to an appropriate cure level. For non-conventional electron beam curing, dosages of 12.5 Mrad have been found suitable.

The method of curing will usually lead to products having different characteristics. For example, gasketing materials which are cured by exposure to an electron beam tend to have higher density values and tensile strengths than do sulfur cured gasketing materials. On the other hand, sulfur cured materials show a higher swell rate in water than do comparable electron beam-cured sheets. In addition, electron beam-cured samples typically show a compressibility of less than about 8% whereas sulfur cured samples give a compressibility of about 25%.

The method of curing will often be dictated by the end use for the gasket. When placed in contact with a liquid, a gasket preferably will swell sufficiently to give a good seal and prevent leaking, but it should not swell so much that it is structurally weakened. In the presence of water, it is common for cork-rubber gaskets to show swelling of the cork but not the binder; however, in the presence of fuel or oil, both the cork and the binder typically are affected. As a result, these gaskets often show a loss of structural integrity, and this has led to the use of high-priced substitutes, such as fluoroelastomer gaskets, in environments where the gaskets are in contact with petroleum based liquids. Therefore, the use of electron beam curing may be preferable for gaskets of the present invention which will be in contact with oil and/or fuel because swelling can often be held to acceptable limits.

As alternatives to the use of a mixer, the components may be combined in a mill and then sheeted off using calender rolls. In addition, the material may be extrusion mixed, such as by using a twin-screw extruder. Calendering and milling provide material with surfaces in which the rice hulls are aligned; however, extrusion can also produce aligned hull surfaces, if properly handled.

Calendering is usually used to produce fairly thin sheets of material because very thick sheets may tend not to adhere to the rolls and be non-uniform. Accordingly, if thicker materials are desired, it is preferable to prepare them by compression molding.

A gasket composition which is produced as described above is not a dispersion of rice hulls in a polymer solution, but rather is a mixture of rice hulls in a polymer blend which contains distinct polyester domains. The existence of the domains can be confirmed by differential scanning calorimetry (DSC) measurements on mixtures of rubber binder and polyester. Thus, rather than seeing a single Tg, as would be the case with two compatible polymers which form a solution, two distinct DSC transitions are seen which correspond to the Tg values for the rubber binder and the polyester, respectively. Furthermore, as heating is continued, an endotherm attributable to the melting of the polyester crystals is seen. If the mixture is rapidly cooled and then reheated, the endotherm is not seen because the polyester has not yet recrystallized; i.e., it recrystallizes very slowly. Nevertheless, on standing, the polyester again assumes its partially crystalline character and the endotherm again becomes detectable by DSC analysis.

The uniqueness of the preferred gasketing materials which may be produced according to the present invention can be attributed in part to the reinforcing character of the rice hulls, which provides good resistance to creep under load, and in part to the partial crystallinity of the polyester. For example, if the gasket is used as a valve cover gasket where it is exposed to engine oil, the partially crystalline polyester will melt as the engine temperature increases, thus allowing the gasket to adapt itself to the contours of the flange. Further, the gasket has good tensile strength at ambient conditions but, when the polyester has melted, it tends to promote good adhesion with the flange. Upon cooling, the partially crystalline nature of the polyester domains is slowly reassumed. This sequence is repeated during subsequent engine operation; therefore, the gasket is able to continually adapt its shape to any changes in flange pressure, an oil leakage is either eliminated or minimized.

Gaskets which may be produced according to the present invention will find use in a variety of environments where they are exposed to water, oil and/or gas. For low-pressure flange applications of from about 50–300 psi they will function in a manner comparable to cork-rubber gaskets; however, for high flange pressures up to about 2000 psi they will function in a manner far superior to cork-rubber because cork-rubber gaskets disintegrate more readily under such pressures. This ability to withstand high flange pressures is a surprising and unexpected result which is attributable almost entirely to the reinforcing nature of the rice hulls (vide supra).

The present invention may be more clearly understood by reference to the following examples which are provided by way of illustration and not limitation.

EXAMPLES

The following materials are used in the examples and are identified by alphabetical letter.

Nitrile Rubber

| Rubber | Description | Source | Acrylonitrile Content |
|---|---|---|---|
| A | 2000 NMG | Polysar | 31.54% |
| B | Paracril 1880 | Uniroyal | 22% |
| C | Paracril CJLT | Uniroyal | 39.5 |

EPDM Rubber

| Rubber | Description | Source | Ethylene/Propylene Ratio |
|---|---|---|---|
| D | 505 EPDM | Uniroyal | 57/43 |

SBR Rubber

| Rubber | Description | Source | Bound Styrene (%) |
|---|---|---|---|
| E | 1502 SBR | Polysar | 23.5 |

Polyesters

| Polyester | Description | Source | Components |
|---|---|---|---|
| A | Polyester 605 Tg = −1° C. Cryst. MP by DSC = 153 and 180° C. | Armstrong (experimental) | Terephthalic Acid (12.0 eq.), Azelaic Acid (8.0 eq.), Ethylene glycol (6.0 eq.), Cyclohexane dimethanol-R90 (14.0 eq.), |

-continued

| Poly-ester | Description | Source | Components |
|---|---|---|---|
| B | Polyester 751<br>Tg = −5° C.<br>Cryst. MP by<br>DSC = 145° C. | Armstrong<br>(experi-<br>mental) | and 1,6-Hexane-<br>diol (5.0 eq.)<br>Terephthalic Acid<br>(10.0 eq.),<br>Azelaic Acid<br>(10.0 eq.)<br>Ethylene glycol<br>(8.0 eq.)<br>Cyclohexane<br>dimethanol-R90<br>(15.0 eq.)<br>and 1,6-Hexane-<br>diol (2.0 eq.) |
| C | Vitel VPE4709<br>Tg = 22 ± 6° C.<br>Cryst. MP by<br>DSC = 130° C. ± 7° C. | Goodyear<br>Chem. | Terephthalic Acid,<br>Isophthalic Acid<br>and 1,4-Butanediol |
| D | Vitel VPE5571A<br>Tg = −5 ± 6° C.<br>Cryst. MP by<br>DSC = 150° C. ± 8° C. | Goodyear<br>Chem. | Azelaic Acid,<br>Terephthalic acid<br>and Ethylene<br>glycol |

A general preparative procedure which may be used to prepare experimental polyesters 605 and 751 is as follows: A 3-liter round-bottom flask is equipped with a packed steam-heated condenser, a stirrer, a nitrogen inlet and a thermometer. The applicable components (the acids, the glycols/diols and an appropriate catalyst such as Fastcat 2001 tin catalyst) are charged into the flask and the mixture is stirred and heated until the temperature reaches 230° C. During the heating process, the nitrogen flow is increased until it reaches about 1.5 SCFH (Standard Cubic Feet per Hour). The distillate is collected and, when the volume has reached approximately 85% of the expected 438 gram quantity, the acid number is monitored until it has dropped to less than 1.0. Excess glycol is then removed and the molecular weight is increased by evacuating the flask to less than 5 millimeters pressure and gradually increasing the temperature to 260° C. After the temperature has reached this value, the pressure is slowly decreased to less than 3 millimeters and then held until the mixture in the flask becomes too thick to stir, or until it is obvious that no useful change is occurring. The theoretically expected amount of distillate is 155 grams. The resulting polyester is partially cooled and then poured into a Teflon lined pyrex dish.

Rice Hulls

Rice hulls were obtained from Multifil International, Inc. under the name Fiber X. A sieve analysis of typical material gave the following results using U.S. Standard sieves:

+100 Mesh: 5%
+200 Mesh: 20%
+325 Mesh: 45%
−325 Mesh: 55%

Curing Accelerators

The curing accelerators used for conventional curing of the gasketing materials contained the components listed below, based on 380 grams of rubber binder.

| Component | Weight (grams) |
|---|---|
| Zinc oxide (Actox 16) activator | 15 |
| Stearic acid activator | 3 |
| ALTAX (MBTS) primary accelerator | 4.5 |
| TMTD (Methyl TUADS) secondary accelerator | 1.5 |
| Sulphur RM-99 vulcanizing agent | 4.5 |
| Component (for EPDM mixtures only) | |
| Zinc oxide (Actox 16) activator | 14.0 |
| Stearic acid activator | 2.8 |
| Royalac 133 primary accelerator | 2.24 |
| Diphenylguanidine secondary accelerator | 0.34 |
| Sulfur RM-99 vulcanizing agent | 3.5 |
| Component (for SBR mixtures only) | |
| Zinc oxide (Actox 16) activator | 14.0 |
| Stearic acid activator | 2.8 |
| ALTAX (MBTS) primary accelerator | 4.2 |
| TMTD (Methyl TUADS) secondary accelerator | 1.4 |
| Sulfur RM-99 vulcanizing agent | 4.2 |

The ALTAX is benzothiazyl disulfide, a thiazole accelerator, the TMTD is a thiuram accelerator, and the Royalac 133 is a dithiocarbamate/thiazole blend. All of these accelerators are well known in the art.

EXAMPLE I

This example will illustrate the physical characteristics of gasketing materials which are obtained when different nitrile rubbers are mixed with rice hulls and polyester A. Percentage values for the components are given in weight percent. All samples were cured by exposure to an electron beam for 11 minutes at a dosage level of 12.5 Mrad. All samples contained 1% Scorchgard 0 to stabilize the rubber during mixing. The sheets which were obtained were tough and had a smooth, leathery feel.

By reference to the Table, Examples IA–IC illustrate that reducing the amount of nitrile rubber A and increasing the amount of polyester A caused a reduction in compressability, but an increase in hardness. In addition, the tensile strength increased, but the swelling in water, Fuel C and ASTM #3 oil decreased.

Similar changes were noted for Nitrile B (Examples ID and IE) and Nitrile C (Examples IF and IG) when polyester A was eliminated. Especially significant, however, was the effect of polyester in Example IF. This example showed a remarkable low swelling in Fuel C of only 4%.

As previously indicated, the polyester helps to facilitate the mixing of the rice hulls; thus, Examples IC, IE and IG which contained no polyester were difficult to mix.

| Sample No. | Nitrile Rubber (%) | Polyester A (%) | Rice Hulls (%) | Tensile Strength (lb/in$^2$) | Density (lb/ft$^3$) | Shore A Hardness | Percent Compressibility (% Recovery) | % Volume Increases by ASTM F-104 Type II | | |
|---|---|---|---|---|---|---|---|---|---|---|
| | | | | | | | | Water | Fuel C | ASTM #3 Oil |
| IA | A (28.6) | 9.5 | 60.9 | 403 | 75.1 | 86 | 7.57 (88.8) | 7 | 36 | 5 |
| IB | A (32.0) | 4.9 | 62.1 | 240 | 70.5 | 76 | 16.4 (83.5) | 17 | 40 | 6 |
| IC | A (36.9) | — | 62.1 | 173 | 67.3 | 68 | 24.4 (86.8) | 26 | 44 | 8 |
| ID | B (27.2) | 9.7 | 62.1 | 203 | 68.1 | — | 12.7 (79.6) | 15 | 46 | 13 |

-continued

| Sample No. | Nitrile Rubber (%) | Polyester A (%) | Rice Hulls (%) | Tensile Strength (lb/in²) | Density (lb/ft³) | Shore A Hardness | Percent Compressibility (% Recovery) | % Volume Increases by ASTM F-104 Type II | | |
|---|---|---|---|---|---|---|---|---|---|---|
| | | | | | | | | Water | Fuel C | ASTM #3 Oil |
| IE | B (36.8) | — | 62.1 | 216 | 67.2 | 69 | 26.6 (88.5) | 21 | 61 | 14 |
| IF | C (27.2) | 9.7 | 62.1 | 371 | 76.2 | — | 9.23 (75.2) | 21 | 4 | 8 |
| IG | C (36.8) | — | 62.1 | 438 | 77.4 | — | 7.7 (82.0) | 18 | 28 | 3 |

EXAMPLE II

This example will illustrate mixtures of Nitrile A with rice hulls and various polyesters. The products were cured either by exposure to electron beam or by conventional curing, as indicated. All samples contained 1% Scorchgard 0, and Examples IIA, IIC and IIE, which were sulfur cured, contained 2.6% by weight of the accelerator package described above.

It is noted that with all samples the use of electron beam curing resulted in an increase in tensile strength and density. On the other hand, the samples which were conventionally cured showed generally better compressibility, and better swelling in water.

EXAMLE III

This example will illustrate the effect of various additives on compositions comprising nitrile rubber A, polyester A and rice hulls. For comparison, reference is made to Example IA. All samples were cured by electron beam and contained 1% Scorchgard 0. Examples IIIC and IIIF also illustrate that, in this system, increasing the amount of rice hulls increases the tensile strength and hardness of the product.

Norsorex is a polynorbornene which is used as a rubber additive. Vestenamer is a high trans content polyoctenamer which is used as a processing aid and to reduce swelling of rubber goods in water. RB-830 is a 1,2-syndiotactic polybutadiene which is sensitive to radiation curing.

| Sample No. | Nitrile A (%) | Polyester A (%) | Rice Hulls (%) | Additive (%) | Tensile Strength (lb/in²) | Shore A Hardness | Percent Compressibility (% Recovery) | % Volume Increases by ASTM F-104 Type II | | |
|---|---|---|---|---|---|---|---|---|---|---|
| | | | | | | | | Water | Fuel C | ASTM #3 Oil |
| IA | 28.6 | 9.5 | 60.9 | — | 403 | 86 | 7.57 (88.8) | 7 | 36 | 5 |
| IIIA | 26.7 | 9.5 | 60.9 | Norsorex (1.9) | 434 | 87 | 7.51 (83.0) | 16 | 38 | 10 |
| IIIB | 26.7 | 9.5 | 60.9 | Vestenamer (1.9) | 346 | 87 | 13.6 (85.0) | 11 | 44 | 10 |
| IIIC | 26.7 | 9.5 | 60.9 | RB-830 (1.9) | 367 | 87 | 7.29 (87.0) | 13 | 36 | 9 |
| IIID | 26.7 | 9.5 | 60.7 | N—phenyl-maleimide (0.47) RB-830 (1.9) | 369 | 88 | 7.31 (83.2) | 15 | 42 | 45 |
| IIIE | 26.5 | 9.5 | 60.7 | Norsorex (1.9) N—phenyl-maleimide (0.47) | 347 | 84 | 9.33 (79.0) | 15 | 46 | 20 |
| IIIF | 38.4 | 13.7 | 43.8 | RB-830 (2.7) | 233 | 65 | 7.50 (78.0) | 14 | 39 | 6 |

EXAMPLE IV

This example will illustrate EPDM rubber, polyester and rice hull compositions. The N-220 carbon was obtained from Phillips Petroleum and is a very fine particle-size material which is known as a reinforcing black. However, by comparison to samples IVA and IVB, the carbon appears to have little reinforcing effect for compositions of the present invention.

| Sample No. | Nitrile A (%) | Polyester (%) | Rice Hulls (%) | Cure Method | Tensile Strength (lb/in²) | Density (lb/ft³) | Shore A Hardness | Percent Compressibility (% Recovery) | % Volume Increases by ASTM F-104 Type II | | |
|---|---|---|---|---|---|---|---|---|---|---|---|
| | | | | | | | | | Water | Fuel C | ASTM #3 Oil |
| IA | 28.6 | A (9.5) | 60.9 | EB* | 403 | 75.1 | 86 | 7.57 (88.8) | 7 | 36 | 5 |
| IIA | 27.8 | A (9.3) | 59.3 | SA** | 250 | 67.3 | 74 | 21.3 (86.3) | 25 | 38 | 7 |
| IIB | 28.6 | C (9.3) | 61.0 | EB | 399 | 71.1 | — | 11.1 (73.8) | 21 | 24 | 6 |
| IIC | 27.8 | C (9.3) | 59.3 | SA | 341 | 67.3 | 80 | 16.4 (82.9) | 21 | 37 | 7 |
| IID | 28.6 | D (9.5) | 61.0 | EB | 290 | 70.7 | — | 15.8 (80.9) | 19 | 38 | 8 |
| IIE | 27.8 | D (9.3) | 59.3 | SA | 275 | 68.5 | 76 | 15.7 (86.8) | 23 | 39 | 7 |

*EB = Electron Beam
**SA = Sulfur Accelerator

| Sample No. | Rubber D (%) | Polyester A (%) | Additive (%) | Rice Hulls (%) | Cure Method | Tensile Strength (lb/in$^2$) | Shore A Hardness | Percent Compressibility (% Recovery) | % Volume Increases by ASTM F-104 Type II | | |
|---|---|---|---|---|---|---|---|---|---|---|---|
| | | | | | | | | | Water | Fuel C | ASTM #3 Oil |
| IVA | 26.6 | 9.5 | — | 60.8 | SA | 128 | 72 | 23.1 (70.1) | 19 | 208 | * |
| IVB | 27.2 | 9.7 | — | 62.1 | EB | 334 | 83 | 9.33 (80.0) | 12 | 150 | 137 |
| IVC | 26.2 | 9.5 | N-220 Carbon (2.4) | 58.4 | SA | 199 | 69 | 31.2 (53.6) | 26 | 143 | * |
| IVD | 27.2 | 9.7 | N-220 Carbon (2.4) | 59.7 | EB | 273 | 82 | 10.3 (79.5) | 14 | 138 | 128 |
| IVE | 26.1 | 9.3 | Norsorex (1.9) | 59.6 | SA | 234 | 81 | 15.5 (74.7) | 16 | 123 | 171 |
| IVF | 27.6 | 9.5 | Norsorex (1.9) | 61.0 | EB | 344 | 85 | 10.7 (76.6) | 18 | 151 | 135 |

*too soft to measure

EXAMPLE V

This example will illustrate SBR rubber, polyester and rice hull compositions. These results clearly show that these gaskets are not suitable for use with Fuel C or ASTM #3 oil, but that they are well suited for use with water. Further, as seen in Example IV, the addition of N-220 Carbon appears to offer no particular advantage.

ample IVA and IVB are included in the table for reference. The table shows that EPDM and SBR rubber gasketing had significantly higher swell rates than did nitrile rubber gasketing when exposed to Fuel C or ASTM No. 3 oil. It is also noted that, when the amount of rice hull filler exceeds about 60% (as in VIF), a sheet product cannot be readily formed unless a processing oil, such as Circosal 480 Oil, is added. The processing oil, however, contributes to high swell rates in ASTM No. 3 oil.

| Sample No. | Rubber E (%) | Polyester A (%) | Additive (%) | Rice Hulls (%) | Cure Method | Tensile Strength (lb/in$^2$) | Shore A Hardness | Percent Compressibility (% Recovery) | % Volume Increases by ASTM F-104 Type II | | |
|---|---|---|---|---|---|---|---|---|---|---|---|
| | | | | | | | | | Water | Fuel C | ASTM #3 Oil |
| VA | 27.2 | 9.7 | — | 62.1 | EB | 262 | 78 | 15.1 (73.6) | 16 | 204 | 183 |
| VB | 26.5 | 9.5 | — | 60.6 | SA | 223 | 71 | 24.8 (74.1) | 17 | 176 | 169 |
| VC | 27.2 | 9.7 | N-220 Carbon (2.4) | 59.7 | EB | 287 | 83 | 10.4 (71.0) | 18 | 119 | 142 |
| VD | 26.5 | 9.5 | N-220 Carbon (2.4) | 58.2 | SA | 302 | 79 | 13.2 (66.4) | 16 | 190 | 190 |

EXAMPLE VI

This example illustrates compositions comprising EPDM rubbers and EPDM-nitrile rubber blends. Ex-

| Sample No. | Rubber (%) | Polyester A (%) | Additive (%) | Rice Hulls (%) | Cure Method | Tensile Strength (lb/in$^2$) | Shore A Hardness | Percent Compressibility (% Recovery) | % Volume Increases by ASTM F-104 Type II | | |
|---|---|---|---|---|---|---|---|---|---|---|---|
| | | | | | | | | | Water | Fuel C | ASTM #3 Oil |
| VIA | D-41.5 | — | — | 57.4 | EB | 259 | 67 | 22.1 (89.1) | 8 | 179 | 156 |
| VIB | D-18.4 A-18.4 | — | — | 62.1 | EB | 290 | 76 | 14.6 (85.7) | 11 | 106 | 75 |
| IVB | D-27.2 | 9.7 | — | 62.1 | EB | 334 | 83 | 9.33 (80.0) | 12 | 150 | 137 |
| VIC | D-13.6 A-13.6 | 9.7 | — | 62.1 | EB | 477 | 89 | 5.9 (75.0) | 12 | 86 | 63 |
| VID | D-13.3 A-13.3 | 9.5 | — | 60.7 | SA | 359 | 84 | 9.41 (76.9) | 17 | 59 | 51 |
| IVA | D-26.6 | 9.5 | — | 60.8 | SA | 128 | 72 | 23.1 (70.1) | 19 | 208 | * |
| VIE | D-31.1 | 4.7 | — | 60.8 | SA | 188 | 67 | 33.1 (73.6) | 18 | 209 | 209 |
| VIF | D-18.0 A-18.0 | — | — | 60.7 | — | (would not mill to form a sheet) | | | | | |
| VIG | D-17.3 A-17.3 | — | Circosal 480 Oil (4.2) | 58.2 | SA | 179 | 65 | 34.7 (75.5) | 13 | 94 | * |
| VIH | D-34.4 | — | Circosal 480 Oil (4.2) | 58.0 | SA | 127 | 54 | 57.9 (45.1) | 14 | 216 | * |

*Too soft to measure

EXAMPLE VII

This example will illustrate the performance of a gasket prepared according to the present invention when it was exposed in an operating engine to engine oil at about 250°–275° F. for 350 hours. The engine used for the test was a 1980 Chevrolet Chevette 1.6 L4 engine, which has an overhead cam design. The internal engine pressure during the test was 2–4 psi.

Gasket IIIE was used as a front cover gasket and the flange pressure typically varied from about 50 to about 300 psi. The gasket thickness was 0.08 inch and its performance was comparable to Armstrong's commercial cork-nitrile rubber gaskets YF-334, XC-300 and NK-730. However, when the flange pressure was increased to about 1,000 psi, gasket IIIE tolerated the added pressure whereas the cork-rubber gaskets could not.

cured. Gaskets NC 710 and NC 711 are high quality gaskets which are substantially more expensive than the gaskets of the present invention. The NC 757 and NC 775 gaskets are less expensive, but show correspondingly poorer compressibility and recovery values. In addition, they also show significant increase in swell values for ASTM #3 oil.

| Sample No. | Rubber A (%) | Polyester A (%) | Rice Hulls (%) | Rice Hull Treatment | Tensile Strength (lb/in²) | Shore A Hardness | Percent Compressibility (% Recovery) | % Volume Increases by ASTM F-104 Type II | | |
|---|---|---|---|---|---|---|---|---|---|---|
| | | | | | | | | Water | Fuel C | ASTM #3 Oil |
| IA | 28.6 | 9.5 | 60.9 | — | 403 | 86 | 7.57 (88.8) | 7 | 36 | 5 |
| IXA | 28.6 | 9.5 | 60.9 | A151 Silane (0.4%) | 339 | 86 | 8.37 (86.2) | 20 | 36 | 5 |
| IC | 36.9 | — | 62.1 | — | 173 | 68 | 24.4 (86.8) | 25 | 44 | 8 |
| IXB | 36.8 | — | 62.1 | A151 Silane (0.4%) | 263 | 74 | 19.0 (86.7) | 26 | 37 | 7 |
| IIA | 27.8 | 9.3 | 59.3 | — | 250 | 74 | 21.3 (86.3) | 25 | 38 | 7 |
| IXC | 27.8 | 9.3 | 59.3 | Soybean Oil (1%) | 210 | 77 | 18.3 (80.1) | 14 | 33 | 9 |
| Armstrong NC 710 Commercial Gasket | | | | | 471 | 67 | 30.0 (85.4) | 3 | 27 | 4 |
| Armstrong NC 711 Commercial Gasket | | | | | 880 | 82 | 16.5 (83.6) | 5 | 22 | −2 |
| Armstrong NC 757 Commercial Gasket | | | | | — | 50–70 | 35–55 (70) | — | — | 25 |
| Armstrong NC 775 Commercial Gasket | | | | | — | 70–85 | 10–25 (75) | — | — | 25 |

EXAMPLE VIII

This example will illustrate the performance of gasket IIID when it was used as a water pump gasket and as a thermostat housing gasket in the same Chevette engine. The flange pressures varied from about 300 to 2,000 psi, which was too high for cork gaskets, and the cooling system temperature was about 200° F. The gaskets performed satisfactorily for 115 hours, at which point the test was terminated.

EXAMPLE IX

This example will illustrate the results when rice hulls were treated with various materials. Examples IXA and IXB are samples in which the rice hulls were treated with vinyl triethoxy silane sold as A-151 Silane by Union Carbide. For reference, untreated samples IA and IC, respectively, are included in the table. Oil treated rice hulls were also used in sample IXC, and the gasket material was compared to Example IIA in which the rice hulls were untreated. The oil-treated rice hulls were obtained from Riceland Foods and were designated by sieve size as being −80 mesh. They were reported to contain 1% soybean oil as a dust suppressant. Examples IA, IC, IXA and IXB were cured by electron beam whereas Examples IIA and IXC were sulfur cured.

As a basis for comparison, the table also contains data for several commercial gaskets, all of which are sulfur

EXAMPLE X

This example will illustrate the gas sealing capability of nitrile rubber-containing gaskets of the present invention in comparison to sealing capabilities which are typically demonstrated by common cork-rubber gasket compositions. The gas leakage test is conducted using an electromechanical air-leakage tester according to procedures which are known in the art. The results also illustrate that if gas sealing is a desirable gasket feature, pretreatment of the rice hulls with soybean oil (as illustrated in Example IXC), or other oil, may be advisable.

| Sample | Flange Pressure (PSI) | Leakage Rate (PSI/Min.) |
|---|---|---|
| Cork-rubber | 200 | 1.00 |
| | 500 | 0.01 |
| IA | 230 | 0.34 |
| | 350 | 0.05 |
| | 460 | 0 |
| IIA | 230 | 0.25 |
| | 350 | 0.01 |
| IXC | 230 | 0.09 |
| | 350 | 0.005 |
| | 460 | 0.001 |

Our invention is not restricted solely to the descriptions and illustrations provided above, but encompasses all modification envisaged by the following claims.

What is claimed is:

1. A cured gasket composition obtained from a mixture comprising by weight
   100 parts of a rubber binder;
   from about 5 to about 1,000 parts of pulverized rice hulls; and
   from about 1 to about 200 parts of a polyester derived from at least one monomeric diol and at least one monomeric diacid or acid derivative, said polyester being at least partially crystalline under ambient conditions and having a Tg of from about −50° to about +80° C. and a weight average molecular weight of from about 1,000 to about 500,000.

2. The invention as set forth in claim 1 hereof wherein said rice hulls are comprised substantially of particles which are smaller than about 30 mesh (U.S. Standard).

3. The invention as set forth in claim 2 hereof wherein said particles are smaller than about 80 mesh.

4. The invention as set forth in claim 1 hereof wherein said polyester has a molecular weight of from about 2,000 to about 300,000.

5. The invention as set forth in claim 4 hereof wherein said molecular weight is from about 2,000 to about 50,000.

6. The invention as set forth in claim 2 hereof wherein said polyester has a molecular weight of from about 2,000 to about 300,000.

7. The invention as set forth in claim 6 hereof wherein said molecular weight is from about 2,000 to about 50,000.

8. The invention as set forth in claim 3 hereof wherein said polyester has a molecular weight of from about 2,000 to about 300,000.

9. The invention as set forth in claim 8 hereof wherein said molecular weight is from about 2,000 to about 50,000.

10. The invention as set forth in claim 6 hereof wherein, for every 100 parts of rubber binder, said mixture comprises from about 50 to about 800 parts of rice hulls and from about 10 to about 150 parts of polyester.

11. The invention as set forth in claim 7 hereof wherein, for every 100 parts of rubber binder, said mixture comprises from about 50 to about 800 parts of rice hulls and from about 10 to about 150 parts of polyester.

12. The invention as set forth in claim 8 hereof wherein, for every 100 parts of rubber binder, said mixture comprises from about 50 to about 800 parts of rice hulls and from about 10 to about 150 parts of polyester.

13. The invention as set forth in claim 9 hereof wherein, for every 100 parts of rubber binder, said mixture comprises from about 50 to about 800 parts of rice hulls and from about 10 to about 150 parts of polyester.

14. The invention is set forth in claim 10 hereof wherein said polyester has a Tg of from about −20° to about +35° C.

15. The invention as set forth in claim .11 hereof wherein said polyester has a Tg of from about −20° to about +35° C.

16. The invention as set forth in claim 12 hereof wherein said polyester has a Tg of from about −20° to about +35° C.

17. The invention as set forth in claim 13 hereof wherein said polyester has a Tg of from about −20° to about +35° C.

18. The invention as set forth in claim 14 hereof wherein said rubber binder is selected from the group consisting of nitrile rubbers, SBR rubbers, neoprene rubbers, EPDM rubbers, and combinations thereof.

19. The invention as set forth in claim 15 hereof wherein said rubber binder is selected from the group consisting of nitrile rubbers, SBR rubbers, neoprene rubbers, EPDM rubbers, and combinations thereof.

20. The invention as set forth in claim 16 hereof wherein said rubber binder is selected from the group consisting of nitrile rubbers, SBR rubbers, neoprene rubbers, EPDM rubbers, and combinations thereof.

21. The invention as set forth in claim 17 hereof wherein said rubber binder is selected from the group consisting of nitrile rubbers, SBR rubbers, neoprene rubbers, EPDM rubbers, and combinations thereof.

22. A cured gasket composition obtained from a mixture comprising by weight
100 parts of a rubber binder;
from about 5 to about 1,000 parts of pulverized rice hulls; and
from about 1 to about 200 parts of a crystallizable polyester derived from at least one monomeric diol and at least one monomeric diacid or acid derivative, said polyester having a weight average molecular weight of from about 1,000 to about 500,000 and having a Tg of from about −50° to about +80° C., said binder and said polyester comprising a polymer blend which exhibits Tg's attributable to the polyester and to the binder, said polyester comprising domains in which said polyester is at least partially crystalline under ambient conditions, but which can assume a substantially non-crystalline state in the operating environment of the gasket.

23. The invention as set forth in claim 22 hereof wherein said rice hulls are comprised substantially of particles which are smaller than about 30 mesh (U.S. Standard).

24. The invention as set forth in claim 23 hereof wherein said particles are smaller than about 80 mesh.

25. The invention as set forth in claim 22 hereof wherein said polyester has a molecular weight of from about 2,000 to about 300,000.

26. The invention as set forth in claim 25 hereof wherein said molecular weight is from about 2,000 to about 50,000.

27. The invention as set forth in claim 23 hereof wherein said polyester has a molecular weight of from about 2,000 to about 300,000.

28. The invention as set forth in claim 27 hereof wherein said molecular weight is from about 2,000 to about 50,000.

29. The invention as set forth in claim 24 hereof wherein said polyester has a molecular weight of from about 2,000 to about 300,000.

30. The invention as set forth in claim 29 hereof wherein said molecular weight is from about 2,000 to about 50,000.

31. The invention as set forth in claim 27 hereof wherein, for every 100 parts of rubber binder, said mixture comprises from about 50 to about 800 parts of rice hulls and from about 10 to about 150 parts of polyester.

32. The invention as set forth in claim 28 hereof wherein, for every 100 parts of rubber binder, said mixture comprises from about 50 to about 800 parts of rice hulls and from about 10 to about 150 parts of polyester.

33. The invention as set forth in claim 29 hereof wherein, for every 100 parts of rubber binder, said mixture comprises from about 50 to about 800 parts of rice hulls and from about 10 to about 150 parts of polyester.

34. The invention as set forth in claim 30 hereof wherein, for every 100 parts of rubber binder, said mixture comprises from about 50 to about 800 parts of rice hulls and from about 10 to about 150 parts of polyester.

35. The invention as set forth in claim 31 hereof wherein the Tg of said polyester is from about −20° to about +35° C.

36. The invention as set forth in claim 32 hereof wherein the Tg of said polyester is from about −20° to about +35° C.

37. The invention as set forth in claim 33 hereof wherein the Tg of said polyester is from about −20° to about +35° C.

38. The invention as set forth in claim 34 hereof wherein the Tg of said polyester is from about −20° to about +35° C.

39. The invention as set forth in claim 35 hereof wherein said rubber binder is selected from the group consisting of nitrile rubbers, SBR rubbers, neoprene rubbers, EPDM rubbers, and combinations thereof.

40. The invention as set forth in claim 36 hereof wherein said rubber binder is selected from the group consisting of nitrile rubbers, SBR rubbers, neoprene rubbers, EPDM rubbers, and combinations thereof.

41. The invention as set forth in claim 37 hereof wherein said rubber binder is selected from the group consisting of nitrile rubbers, SBR rubbers, neoprene rubbers, EPDM rubbers, and combinations thereof.

42. The invention as set forth in claim 38 hereof wherein said rubber binder is selected from the group consisting of nitrile rubbers, SBR rubbers, neoprene rubbers, EPDM rubbers, and combinations thereof.

43. A process for forming a gasket material, said process comprising the steps of
preparing a composition comprising by weight
(a) 100 parts of a rubber binder;
(b) from about 5 to about 1,000 parts of pulverized rice hulls; and
(c) from about 1 to about 200 parts of a polyester derived from at least one monomeric diol and at least one monomeric diacid or acid derivative, said polyester being at least partially crystalline under ambient conditions and having a Tg of from about −50° to about +80° C. and a weight average molecular weight of from about 1,000 to about 500,000;
forming said composition into a desired configuration, and
curing said formed composition.

44. The invention as set forth in claim 43 hereof wherein said rice hulls are comprised substantially of particles which are smaller than about 30 mesh (U.S. Standard).

45. The invention as set forth in claim 44 hereof wherein said particles are smaller than about 80 mesh.

46. The invention as set forth in claim 43 hereof wherein said polyester has a molecular weight of from about 2,000 to about 300,000.

47. The invention as set forth in claim 46 hereof wherein said molecular weight is from about 2,000 to about 50,000.

48. The invention as set forth in claim 44 hereof wherein said polyester has a molecular weight of from about 2,000 to about 300,000.

49. The invention as set forth in claim 48 hereof wherein said molecular weight is from about 2,000 to about 50,000.

50. The invention as set forth in claim 45 hereof wherein said polyester has a molecular weight of from about 2,000 to about 300,000.

51. The invention as set forth in claim 50 hereof wherein said molecular weight is from about 2,000 to about 50,000.

52. The invention as set forth in claim 48 hereof wherein, for every 100 parts of rubber binder, said mixture comprises from about 50 to about 800 parts of rice hulls and from about 10 to about 150 parts of polyester.

53. The invention as set forth in claim 49 hereof wherein, for every 100 parts of rubber binder, said mixture comprises from about 50 to about 800 parts of rice hulls and from about 10 to about 150 parts of polyester.

54. The invention as set forth in claim 50 hereof wherein, for every 100 parts of rubber binder, said mixture comprises from about 50 to about 800 parts of rice hulls and from about 10 to about 150 parts of polyester.

55. The invention as set forth in claim 51 hereof wherein, for every 100 parts of rubber binder, said mixture comprises from about 50 to about 800 parts of rice hulls and from about 10 to about 150 parts of polyester.

56. The invention as set forth in claim 52 hereof wherein said polyester has a Tg of from about −20° to about +35° C.

57. The invention as set forth in claim 53 hereof wherein said polyester has a Tg of from about −20° to about +35° C.

58. The invention as set forth in claim 54 hereof wherein said polyester has a Tg of from about −20° to about +35° C.

59. The invention as set forth in claim 55 hereof wherein said polyester has a Tg of from about −20° to about +35° C.

60. The invention as set forth in claim 56 hereof wherein said rubber binder is selected from the group consisting of nitrile rubbers, SBR rubbers, neoprene rubbers, EPDM rubbers, and combinations thereof.

61. The invention as set forth in claim 57 hereof wherein said rubber binder is selected from the group consisting of nitrile rubbers, SBR rubbers, neoprene rubbers, EPDM rubbers, and combinations thereof.

62. The invention as set forth in claim 58 hereof wherein said rubber binder is selected from the group consisting of nitrile rubbers, SBR rubbers, neoprene rubbers, EPDM rubbers, and combinations thereof.

63. The invention as set forth in claim 59 hereof wherein said rubber binder is selected from the group consisting of nitrile rubbers, SBR rubbers, neoprene rubbers, EPDM rubbers, and combinations thereof.

* * * * *